United States Patent
Modin et al.

(10) Patent No.: US 8,636,936 B2
(45) Date of Patent: Jan. 28, 2014

(54) METHOD FOR FABRICATING A LAMINATED FIBER METAL COMPOSITE

(75) Inventors: Andrew E. Modin, Enumclaw, WA (US); Robert D. Hawkins, Bonney Lake, WA (US); Robert G. Albers, Kent, WA (US); Jack A. Woods, Kent, WA (US)

(73) Assignee: The Boeing Company, Chicago, IL (US)

( * ) Notice: Subject to any disclaimer, the term of this patent is extended or adjusted under 35 U.S.C. 154(b) by 1388 days.

(21) Appl. No.: 11/328,012

(22) Filed: Jan. 9, 2006

(65) Prior Publication Data

US 2006/0108059 A1     May 25, 2006

Related U.S. Application Data

(62) Division of application No. 10/649,280, filed on Aug. 27, 2003, now abandoned.

(51) Int. Cl.
*B29C 45/14*     (2006.01)
*B29C 65/00*     (2006.01)
*B32B 3/10*     (2006.01)

(52) U.S. Cl.
USPC ........... 264/273; 264/257; 264/258; 264/259; 264/271.1; 264/274; 264/279; 156/250; 156/252; 156/256; 156/264; 156/290; 156/307.1; 156/307.7

(58) Field of Classification Search
USPC .......... 264/258, 316, DIG. 70, 156, 257, 259, 264/271.1, 273, 274, 279; 156/250, 252, 156/256, 264, 290, 307.1, 307.7; 428/138
See application file for complete search history.

(56) References Cited

U.S. PATENT DOCUMENTS

| | | | | |
|---|---|---|---|---|
| 2,913,036 A * | 11/1959 | Smith | ........................... | 264/102 |
| 3,222,243 A * | 12/1965 | Gaston et. al. | ................ | 428/138 |
| 3,588,440 A * | 6/1971 | Morse | ...................... | 219/121.65 |
| 4,029,838 A * | 6/1977 | Chamis et al. | ............. | 428/293.1 |
| 4,132,755 A * | 1/1979 | Johnson | ........................ | 264/553 |
| 4,274,901 A * | 6/1981 | Elber | ........................... | 156/242 |
| 5,052,906 A * | 10/1991 | Seemann | ...................... | 425/112 |
| 5,217,656 A * | 6/1993 | Buckley et al. | ................ | 264/490 |
| 5,338,497 A * | 8/1994 | Murray et al. | ................. | 264/486 |
| 5,439,635 A * | 8/1995 | Seemann | ...................... | 264/510 |
| 5,500,511 A | 3/1996 | Hansen et al. | | |
| 5,717,191 A | 2/1998 | Christensen et al. | | |
| 5,935,475 A | 8/1999 | Scoles et al. | | |
| 6,096,669 A * | 8/2000 | Colegrove et al. | ............ | 442/366 |
| 6,284,089 B1 | 9/2001 | Anderson et al. | | |
| 6,565,942 B2 | 5/2003 | Anderson et al. | | |
| 7,300,693 B2 * | 11/2007 | Albers et al. | ................... | 428/139 |
| 2008/0131661 A1 * | 6/2008 | Albers et al. | ................... | 428/139 |

OTHER PUBLICATIONS

Melograna, J.D., J.L. Grenestedt, Improving joints between composites and steel using perforations, Composites: Part A, vol. 33 (2002), pp. 1253-1261.*

* cited by examiner

*Primary Examiner* — Atul P. Khare

(57) ABSTRACT

A method for fabricating a laminated composite body including a metal foil and a plurality of fiber plies. The method includes perforating a sheet of metal foil, stacking the perforated metal foil sheet and the plurality of fiber plies in face to face relation in a predetermined order and orientation, and infusing resin into the stacked sheet and plies so that resin flows through the perforations in the metal foil sheet and intersperses between the plurality of fiber plies to form the laminated composite body.

7 Claims, 9 Drawing Sheets

METHOD FOR FABRICATING A LAMINATED FIBER METAL COMPOSITE

CROSS REFERENCE TO RELATED APPLICATION

This is a divisional of co-pending U.S. application Ser. No. 10/649,280, filed on Aug. 27, 2003, which is incorporated herein by reference to the extent permitted by law.

BACKGROUND OF THE INVENTION

The present invention relates generally to laminated composites, and more specifically to laminated fiber metal composites.

Although conventional laminated fiber/resin composites offer strength and weight advantages over traditional metals, such fiber/resin composites have insufficient bearing strength for some applications, for example high performance airframe components. Laminated fiber metal composites have been developed to increase bearing strength and other properties by positioning a solid metal foil sheet between adjacent pre-impregnated fiber plies in the composite laminate. However, if it is desired to infuse resin into a dry preform of fiber plies using a resin infusion process, the metal foil sheet can inhibit resin flow, resulting in resin starved regions. Alternate methods of infusing resin throughout the dry fiber plies include wet winding each fiber ply before stacking, and resin film infusion, wherein a thin sheet of resin is interleaved between fiber plies during stacking. However, such methods are disadvantageous due to manufacturing difficulties and additional cost.

SUMMARY OF THE INVENTION

In one aspect, a method is provided for fabricating a laminated composite body including a metal foil and a plurality of fiber plies. The method includes perforating a sheet of metal foil, stacking the perforated metal foil sheet and the plurality of fiber plies in face to face relation in a predetermined order and orientation, and infusing resin into the stacked sheet and plies so that resin flows through the perforations in the metal foil sheet and intersperses between the plurality of fiber plies to form the laminated composite body. through the perforations in the metal foil sheet and intersperses between the plurality of fiber plies to form the laminated composite body.

In another aspect, the present invention includes a laminated composite body including a perforated metal foil sheet having a plurality of openings extending through the sheet from a first face to a second face opposite the first face, and a fiber ply including a plurality of reinforcing fibers. The fiber ply is positioned adjacent the first face of the metal foil sheet. The body also includes a resin extending through the openings in the metal foil sheet and between the plurality of reinforcing fibers of the fiber ply.

In yet another aspect, a method is provided for fabricating a laminated composite body including a metal foil and a plurality of fiber plies. The method includes arranging a plurality of metal foil strips into a layer so a plurality of gaps space apart adjacent strips in the layer, stacking the layer of metal foil strips and the plurality of fiber plies in face to face relation in a predetermined order and orientation, and infusing resin into the stacked sheet and plies so that resin flows through the gaps in the layer and intersperses between the plurality of fiber plies to form the laminated composite body.

In even another aspect, the present invention includes a laminated composite body including a layer of metal foil strips having a plurality of gaps spacing apart adjacent strips in the layer, a fiber ply including a plurality of reinforcing fibers, the fiber ply being positioned adjacent the layer of metal foil strips, and a resin extending through the gaps in the layer of metal foil strips and between the plurality of reinforcing fibers of said fiber ply.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
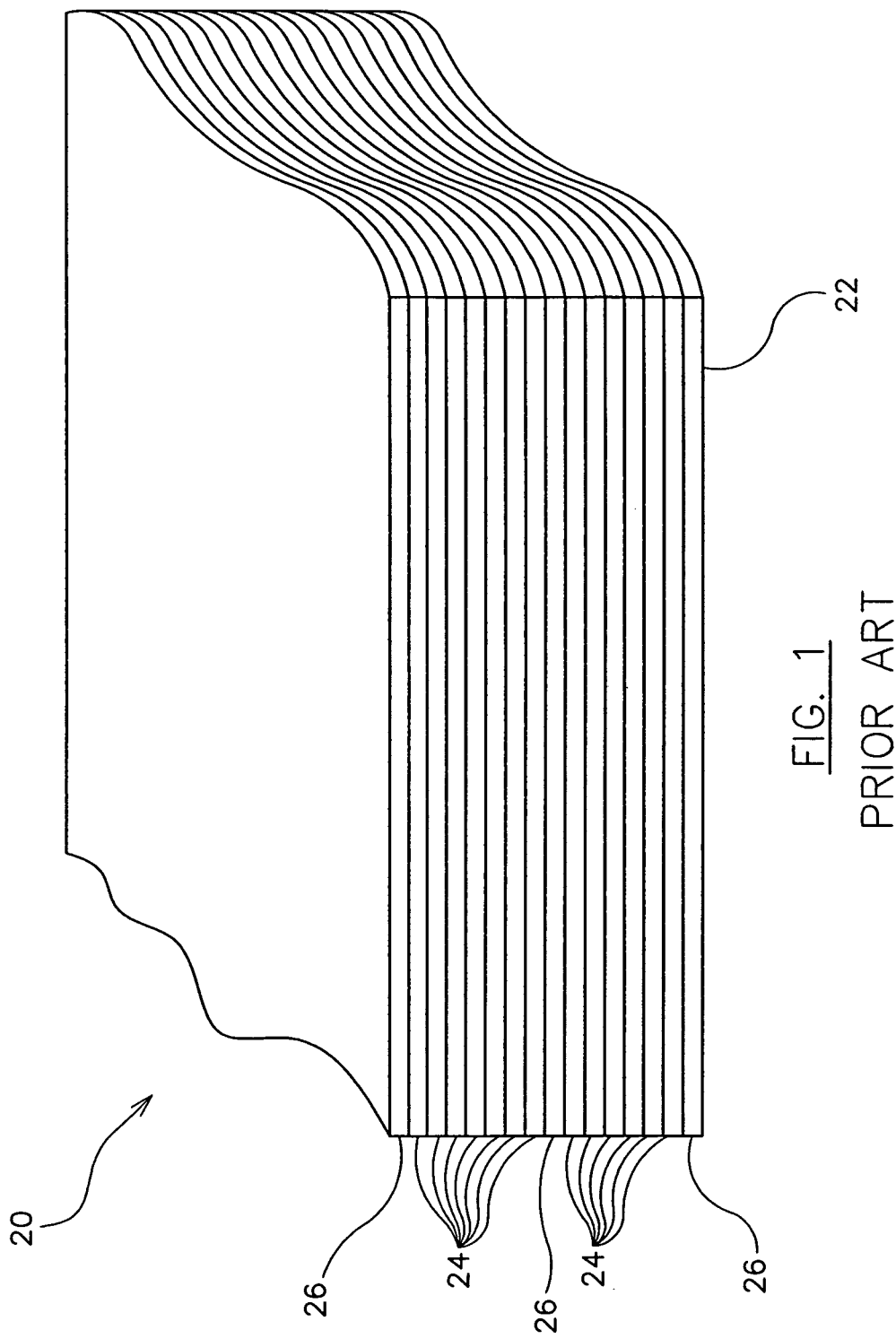
FIG. 1 is a perspective of a portion of a conventional laminated fiber metal composite.

Referring now to the drawings, and more specifically to FIG. 1, a conventional laminated fiber metal composite is designated in its entirety by the reference numeral 20. The composite 20 includes a body 22 having a plurality of fiber plies 24 and a plurality of metal foil sheets 26 stacked in face to face relation in a predetermined order and orientation. Each fiber ply 24 has a resin mixture (not shown) interspersed between a plurality of reinforcing fibers (not shown). Each metal foil sheet 26 is uninterrupted throughout its length and width and is sized and shaped similarly to the fiber plies 24. Because the metal foil sheets 26 are generally solid, the resin mixture may need to be interspersed between the fibers of each fiber ply and/or positioned between the fiber plies prior to lamination, for example by prepegging the fibers, wet-winding each fiber ply, resin transfer molding, and/or resin film infusion. Fiber metal laminates such as the laminate 20 may be used for many different applications, such as armor systems, high performance automotive components, and high-performance aerospace components.

Figure 2:
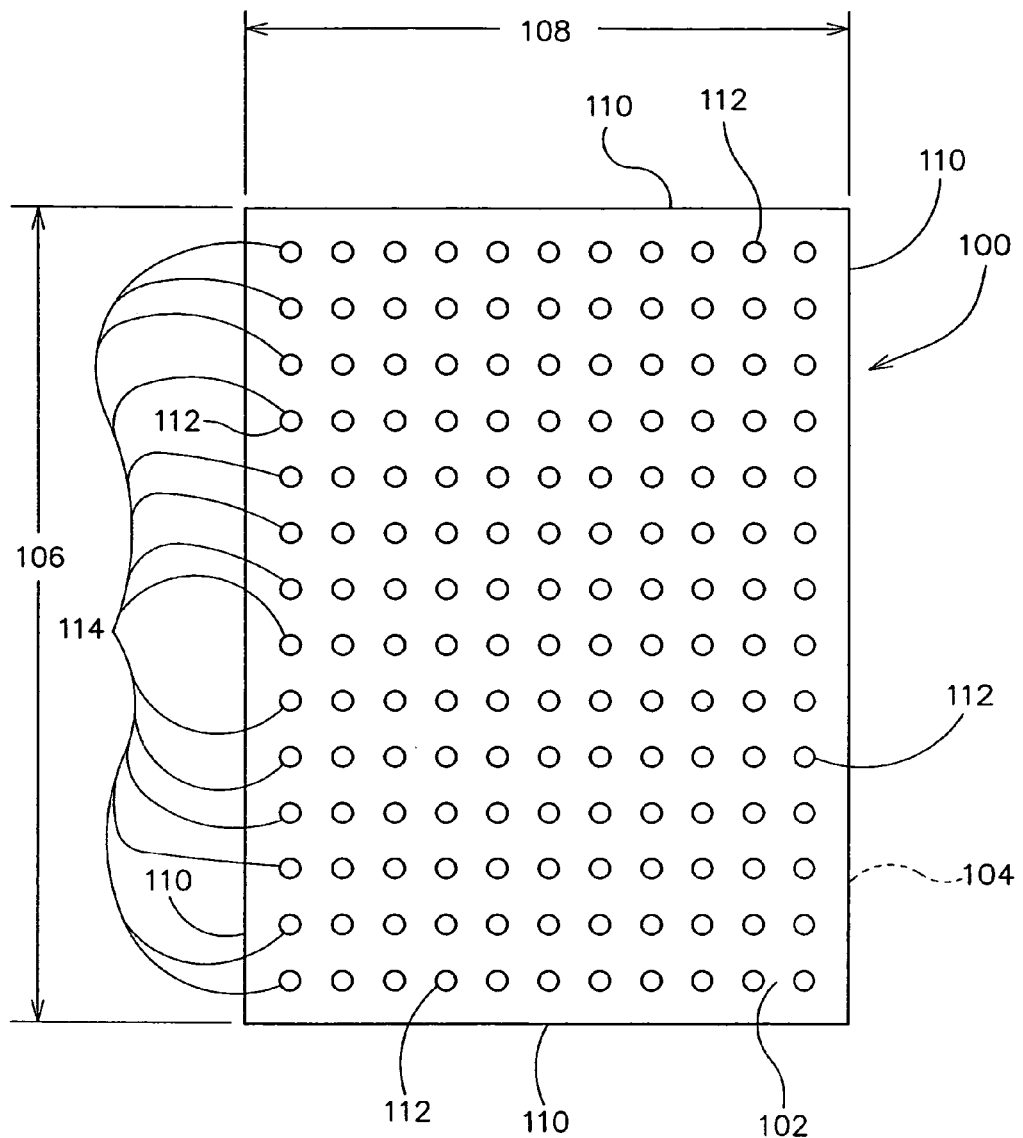
FIG. 2 is a top plan of a metal foil sheet of the present invention.
Figure 3:
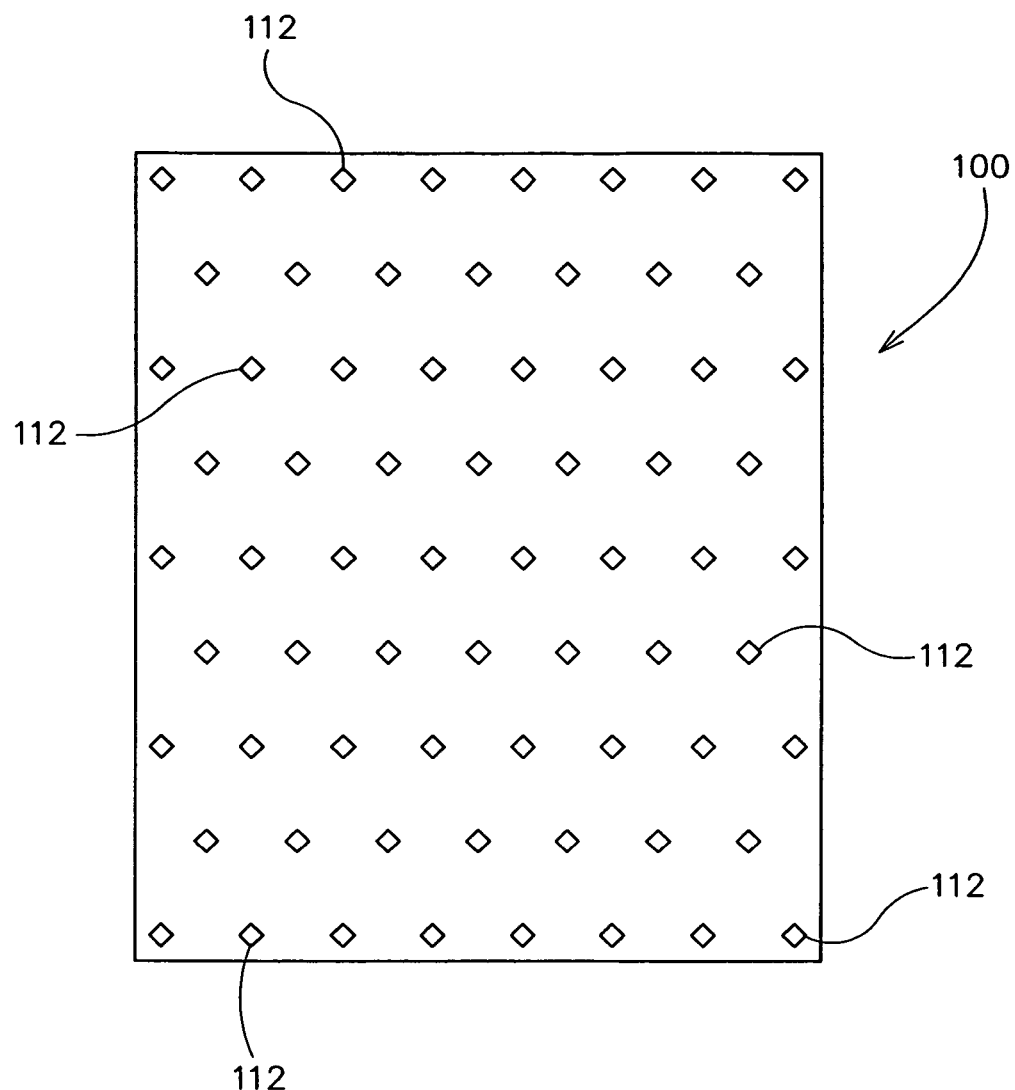
FIG. 3 is a top plan of an alternative metal foil sheet of the present invention.
Figure 4:
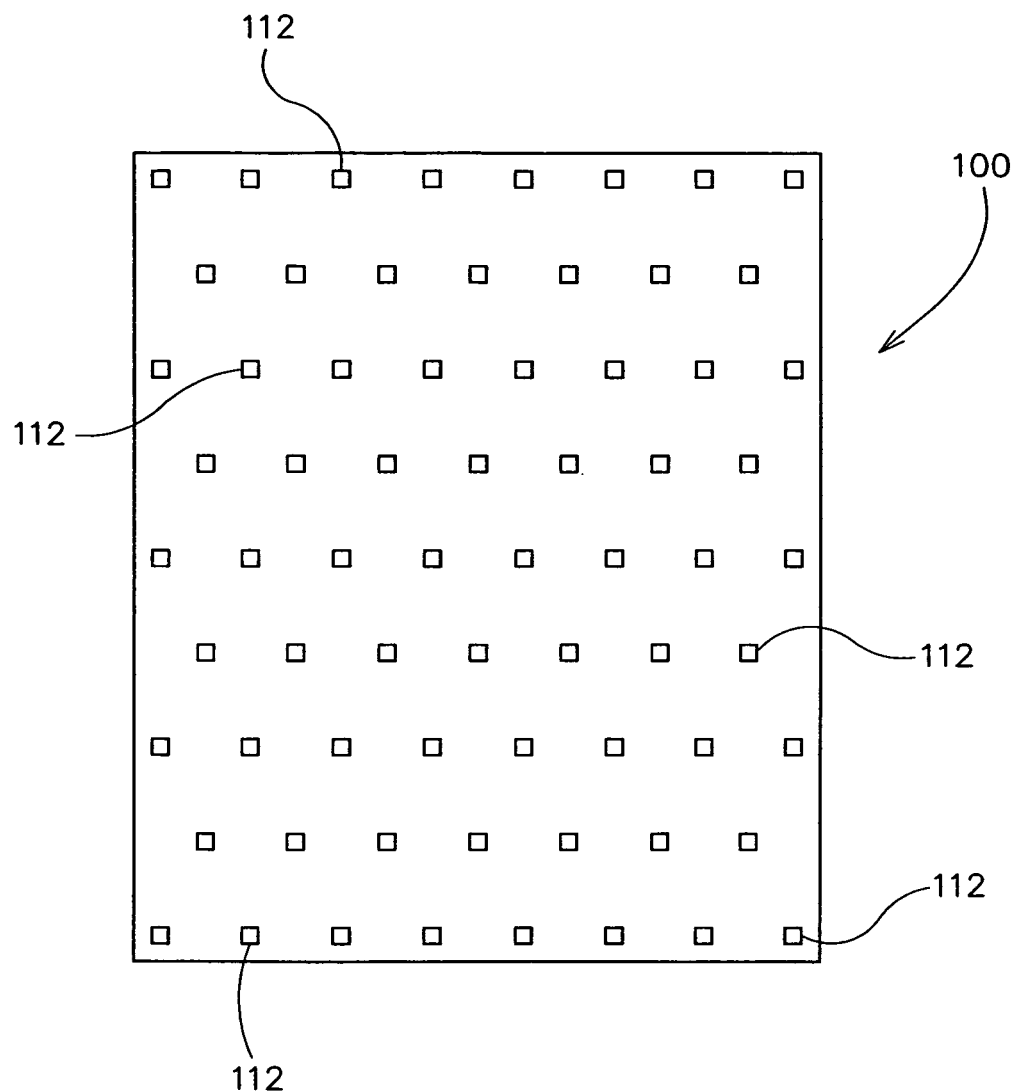
FIG. 4 is a top plan of another alternative metal foil sheet of the present invention.

FIG. 2 is a top plan of a metal foil sheet, generally designated by the reference numeral 100, used in making laminated fiber metal composite structures of the present invention. The sheet 100 has a first face 102 and a second face 104 opposite the first face. Although the sheet 100 may have other thicknesses without departing from the scope of the present invention, in one embodiment the sheet has a thickness of between about 0.005 inches and about 0.015 inches. The metal foil sheet 100 extends a length 106 and a width 108 between a plurality of edges 110. In one embodiment, the sheet 100 is made of titanium (e.g., TI 15-3-3-3). In another embodiment, the sheet 100 is made of aluminum (e.g., T-6061). In yet another embodiment, the sheet 100 is a combination of two or more metals. The metal foil sheet 100 is perforated so it has a plurality of openings 112 extending through the sheet from the first face 102 to the second face 104. The openings 112 may have a variety of shapes and sizes suitable to facilitate flow of a resin mixture therethrough. For example, in one embodiment, the openings 112 are generally circular. In alternative embodiments, the openings 112 may have other suitable shapes. For example, the openings may be generally diamond shaped as illustrated in FIG. 3, or generally square as illustrated in FIG. 4. Although the openings 112 may have other dimensions without departing from the scope of the present invention, in one circular opening embodiment, each opening has a diameter of about 0.01 inches. In another embodiment, the openings 112 each have a diameter of about 0.04 inches. In yet another embodiment, the openings 112 each have a diameter of between about 0.01 inches and about 0.04 inches. Furthermore, the metal foil sheet 100 may include a variety of differently shaped and/or sized openings 112. It should be understood that the metal foil sheet 100 may have any number of the openings 112, each having any size and shape suitable for facilitating the flow of a resin mixture through the sheet, regardless of whether such size and shape is explicitly mentioned herein.

The plurality of openings 112 may be arranged on the metal foil sheet 100 in any suitable pattern for facilitating the flow of a resin mixture through the sheet. For example, as illustrated in FIG. 2 the plurality of openings 112 are arranged in a series of rows 114 spaced generally evenly along the sheet length 106, wherein each row has a plurality of the openings spaced generally evenly along a portion of the sheet width 108. FIG. 3 illustrates another exemplary pattern for the openings 112. In one embodiment, the openings 112 are spaced generally evenly apart on the sheet 100 by, for example, between about 0.25 inches and about 2.0 inches. In another embodiment, the openings 112 are spaced apart by varying distances. It should be understood that the plurality of openings 112 may be each spaced from adjacent openings by any suitable distance, and additionally the plurality of openings may be arranged on the sheet 100 in other patterns not specifically discussed and/or illustrated herein.

The plurality of openings 112 may be formed within the sheet using any suitable manufacturing process. For example, in one embodiment the openings 112 are formed by directing a pulsed laser at the metal foil sheet 100.

Figure 5:
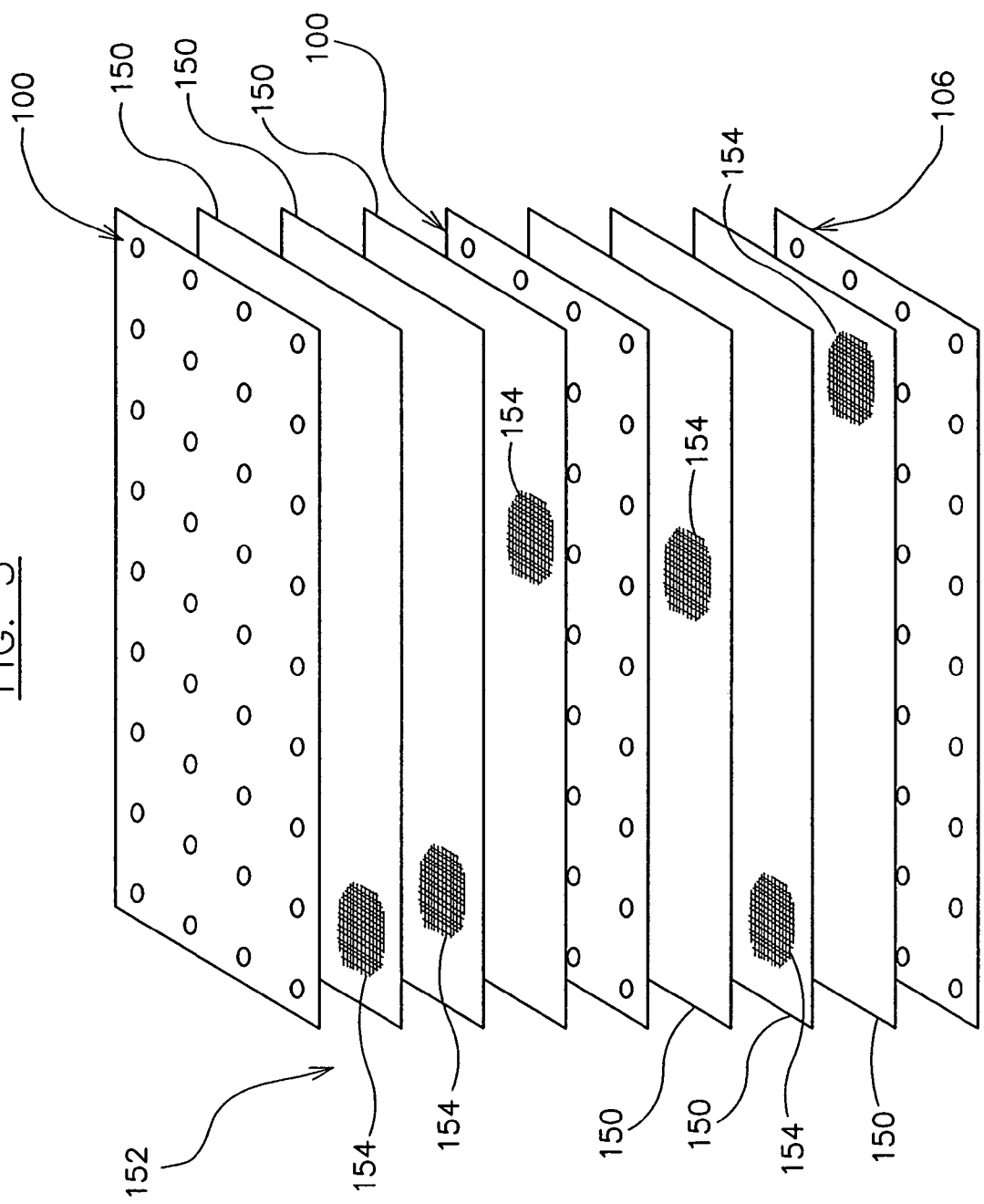
FIG. 5 is a separated perspective of a laminated fiber metal composite preform of the present invention.
Figure 6:
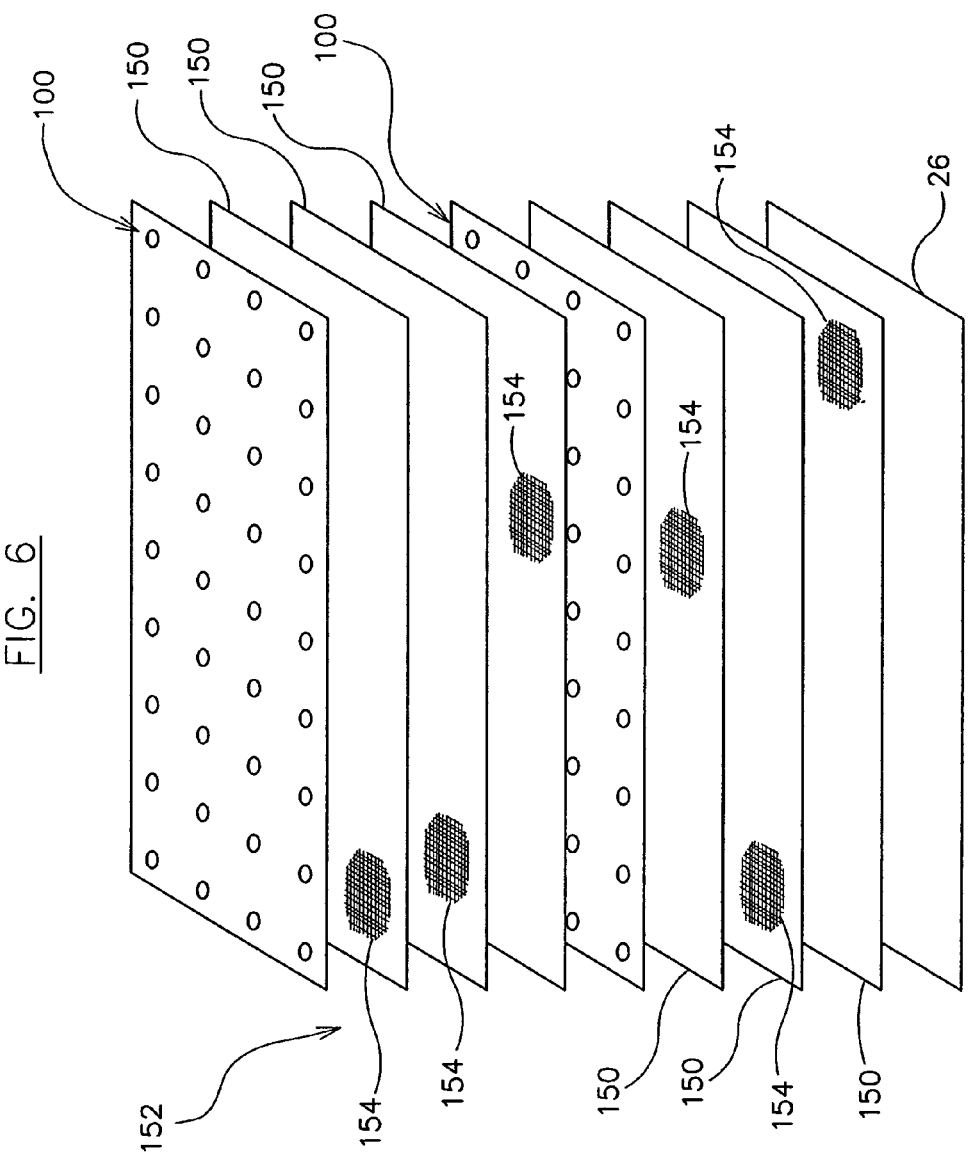
FIG. 6 is a separated perspective of an alternative laminated fiber metal composite preform of the present invention.

As illustrated in FIG. 5, at least one metal foil sheet 100 is stacked together with a plurality of fiber plies 150 in face to face relation and in a predetermined order and orientation to form a fiber metal composite preform of the present invention, designated in its entirety by the reference numeral 152. Similar to the conventional laminated fiber metal composite 20 (FIG. 1), each fiber ply 150 has a plurality of reinforcing fibers 154. In one embodiment, the reinforcing fibers 154 are fiberglass. In another embodiment, the reinforcing fibers 154 are carbon fibers. In yet another embodiment, the reinforcing fibers 154 are aramid fibers. It should be understood that the reinforcing fibers 154 may be any suitable fiber or combination of different fibers. Further, the fibers 154 of each ply may be oriented in one common direction or in a plurality of directions without departing from the scope of the present invention. In the embodiment illustrated in FIG. 5, the preform 152 includes a plurality of metal foil sheets 100, and more specifically includes two perforated metal foil sheets having the plurality of fiber plies 150 positioned between them, and another perforated sheet positioned between two adjacent fiber plies of the plurality of fiber plies. As will be appreciated by those skilled in the art, the fiber plies 150 may be oriented so the fibers of each ply extend in a single common direction or they may be oriented in other directions to provide desired strength and stiffness for the finished body. Additionally, as illustrated in FIG. 6, the plurality of fiber plies 150 may be positioned within the preform 152 between a perforated metal foil sheet 100 and a non-perforated metal foil sheet (e.g., the metal foil sheet 26 illustrated in FIG. 1), and the preform may also include a perforated metal foil sheet positioned between two adjacent fiber plies of the plurality of fiber plies. However, it should be understood that the preform 152 may include any number of metal foil sheets whether perforated or non-perforated, such that the preform 152 includes a perforated metal foil sheet 100 having a face (e.g., the first face 102) positioned adjacent a fiber ply 150. Furthermore, it should be understood that the fiber metal composite preform 152 may include a variety of metal foil sheets, whether perforated or non-perforated, formed from different metals and/or metal alloys.

Figure 7:
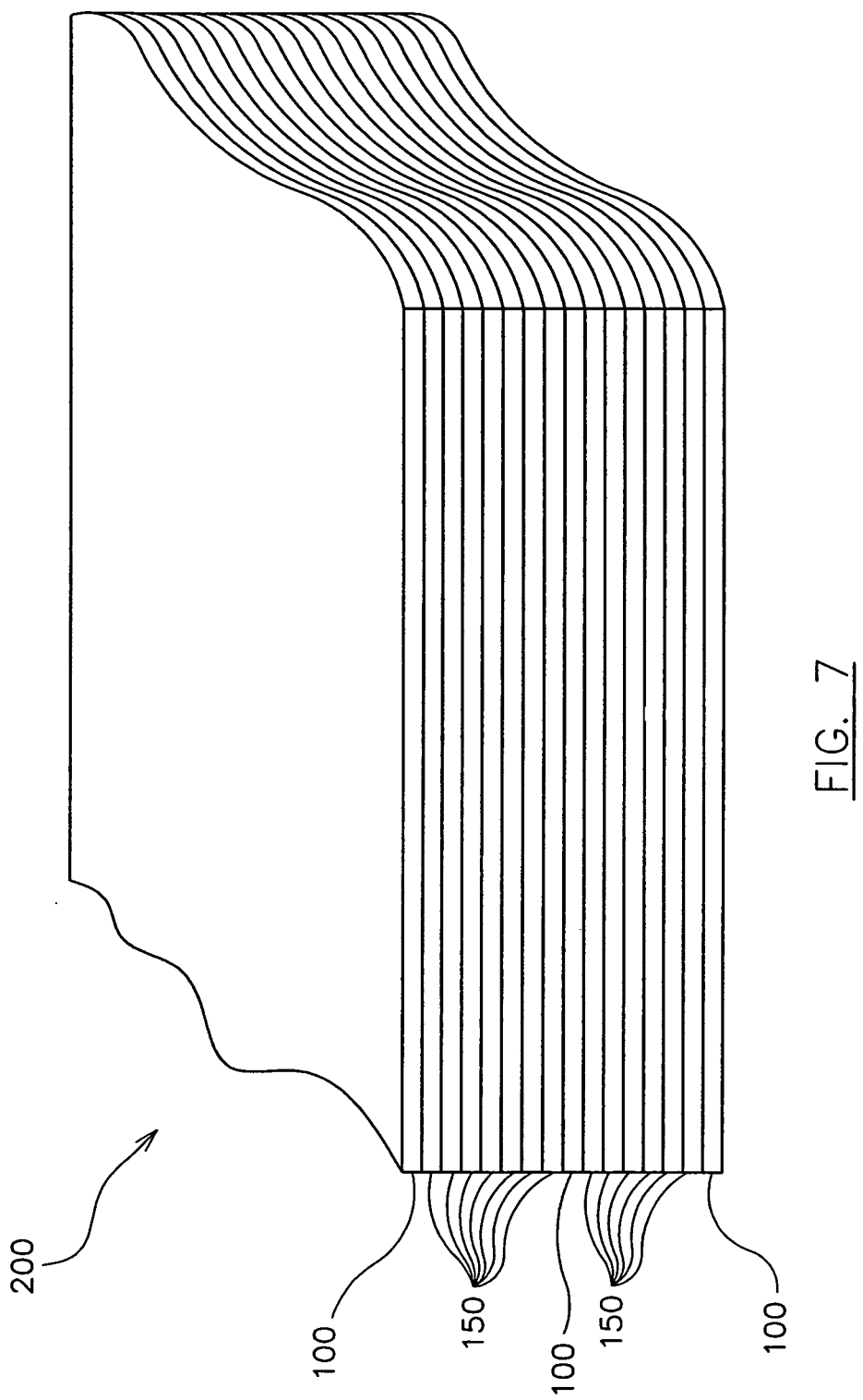
FIG. 7 is a perspective of a portion of a laminated fiber metal composite body of the present invention.

To form a laminated fiber metal composite body, such as the laminated fiber metal composite body portion illustrated in FIG. 7 and generally designated by the reference numeral 200, the fiber metal composite preform 152 (FIG. 5) is infused with a resin mixture and laminated to bond the plurality of fiber plies 150 and the metal foil sheet(s) 100 together. In one embodiment, the body 200 is cured after lamination to facilitate bonding the plurality of fiber plies 150 and the metal foil sheets(s) 100 together. More specifically, a resin infusion process is used to infuse the resin mixture into the preform 152 such that the resin mixture flows through the plurality of fiber plies 150 and the openings 112 (FIG. 5) within the metal foil sheet(s) 100. As the resin mixture flows through the fiber plies 150 and the metal foil sheet(s) 100, the resin mixture intersperses between the plurality of fiber plies, and more specifically between the reinforcing fibers 154 of each fiber ply. A variety of resin infusion processes are suitable for infusing a resin mixture into the preform 152, such as, for example, resin transfer molding, vacuum assisted resin transfer molding, seemann composites resin infusion molding process (SCRIMP®), and controlled atmospheric pressure resin infusion. SCRIMP is a federally registered trademark of TPI Technology, Inc of Warren, R.I. A mold may be used during stacking of the fiber plies 150 and the metal foil sheet(s) 100, and during lamination of the preform 152, to control a shape of the laminated fiber metal composite body 200.

Figure 8:
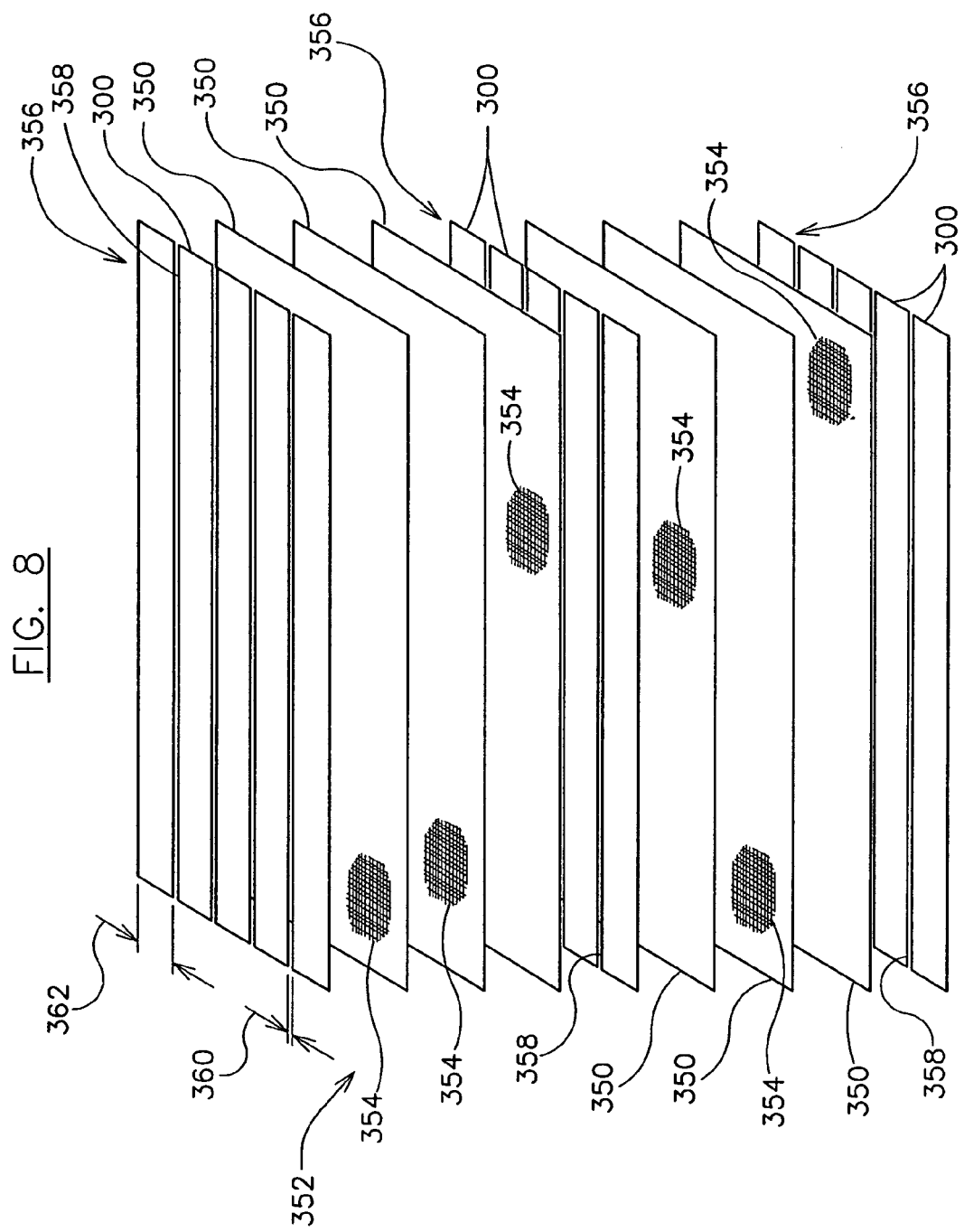
FIG. 8 is a separated perspective of a laminated fiber metal composite preform of the present invention.

As illustrated in FIG. 8, a plurality of metal foil strips 300 may also be used to make laminated fiber metal composite structures of the present invention. Although the strips 300 may have other thicknesses without departing from the scope of the present invention, in one embodiment the strips each have a thickness of between about 0.005 inches and about 0.015 inches. It is envisioned the thickness of each strip 300 may vary along its length and/or width. Further, it is envisioned that some strips may have different thicknesses from other strips without departing from the scope of the present invention. In one embodiment, the strips 300 are made of titanium (e.g., TI 15-3-3-3). Alternatively, the strips 300 are made of aluminum (e.g., T-6061). It is further envisioned that the strips 300 are made of a combination of two or more metals.

As shown in FIG. 8, the metal foil strips 300 are stacked with a plurality of fiber plies 350 in face to face relation and in a predetermined order and orientation to form a fiber metal composite preform, generally designated by 352. Similar to the laminated fiber metal composite 200 (FIG. 7), each fiber ply 350 has a plurality of reinforcing fibers 354 such as fiberglass, carbon fibers or aramid fibers. It is envisioned the reinforcing fibers 354 may be any suitable fiber or combination of different fibers. Further, the fibers 354 of each ply may be oriented in one common direction or in a plurality of directions without departing from the scope of the present invention. In the embodiment illustrated in FIG. 8, the strips 300 are stacked with the fiber plies 350 so a plurality of the strips are arranged in side by side relation to form at least one layer (generally designated by 356) of strips within the preform 352. The strips 300 are arranged side by side so that at least two adjacent strips in each layer are spaced by a gap 358. In one embodiment, each of the strips 300 is spaced from adjacent strips by a gap 358. The gaps 358 facilitate flow of resin mixture through the layer 356, and more specifically through the gaps. Although the gaps 358 may have other widths 360 without departing from the scope of the present invention, in one embodiment each of the gaps has a width of between about 0.01 inches and about 0.05 inches. It is envisioned the gaps 358 may have varying widths to facilitate flow of a resin mixture through the gaps. Additionally, it should be understood that each layer 356 may include any number of metal foil strips 300, and the strips within each layer may be spaced by gaps 358 having any suitable width 360. Further, it is envisioned the widths may be identical within each layer, vary within each layer, vary from layer to layer, or be constant throughout the preform 352.

Although the strips 300 may have other widths 362 without departing from the scope of the present invention, in one embodiment the strips each have a width of between about 0.125 inches and about 2.0 inches. In one embodiment the strips 300 have varying widths. Additionally, although the strips 300 are shown in FIG. 8 as generally rectangular, it should be understood that the strips may have a variety of shapes and sizes suitable to facilitate flow of resin mixture through the gaps 358 without departing from the scope of the present invention. For example, some or all of the strips 300 may have widths 362 that vary along their respective lengths.

In the embodiment illustrated in FIG. 8, the preform 352 includes a plurality of metal foil strip layers 356, and more specifically includes two layers having the plurality of fiber plies 350 positioned between them, and another metal foil strip layer positioned between two adjacent fiber plies of the plurality of fiber plies. As will be appreciated by those skilled in the art, the fiber plies 350 may be oriented so the fibers of each ply extend in a single common direction or they may be oriented in other directions to provide desired strength and stiffness for the finished body. Additionally, the plurality of fiber plies 350 may be positioned within the preform 352 between a metal foil strip layer 356 and a metal foil sheet (e.g., the metal foil sheet 26 illustrated in FIG. 1 or the perforated metal foil sheet 100 illustrated in FIG. 2), and the preform may also include a layer of metal foil strips positioned between two adjacent fiber plies of the plurality of fiber plies. However, it should be understood that the preform 352 may include any number of metal foil strip layers 356, and additionally may include any number of metal foil sheets (whether perforated or non-perforated) such that the preform 352 includes a layer of metal foil strips positioned adjacent a fiber ply 350. Furthermore, it should be understood that the fiber metal composite preform 352 may include a variety of metal foil strips 300, and that these strips may be arranged in the same layer 356 or different layers. Still further, the strips 300 may be formed from different metals and/or metal alloys without departing from the scope of the present invention.

The plurality of strips 300 may be arranged within each layer 356 in any suitable pattern. Further, the pattern in which the strips 300 are arranged may vary from layer to layer or be similar for each layer. For example, as illustrated in FIG. 8 the plurality of strips 300 in each layer 356 may extend longitudinally along a length of the preform 352. Alternatively, the plurality of strips 300 in one or more layers 356 may extend transversely across a width of the preform 352. Other configurations are also envisioned as being within the scope of the present invention. For example, a plurality of strips 300 may extend diagonally across the preform 352, a plurality of strips may be woven together, and/or a plurality of strips may overlap one another in a criss-cross pattern. Additionally, a plurality of glass fibers may be woven around one or more of the strips 300 to control the gaps 358 between the strips and control the position of the strips within the preform 352, regardless of the pattern in which the strips are arranged. It should be understood that the plurality of strips 300 in each layer 356 may be arranged in other patterns not specifically discussed and/or illustrated herein, such that the strips in each layer are arranged in any suitable pattern facilitating the flow of a resin mixture through the layer.

Figure 9:
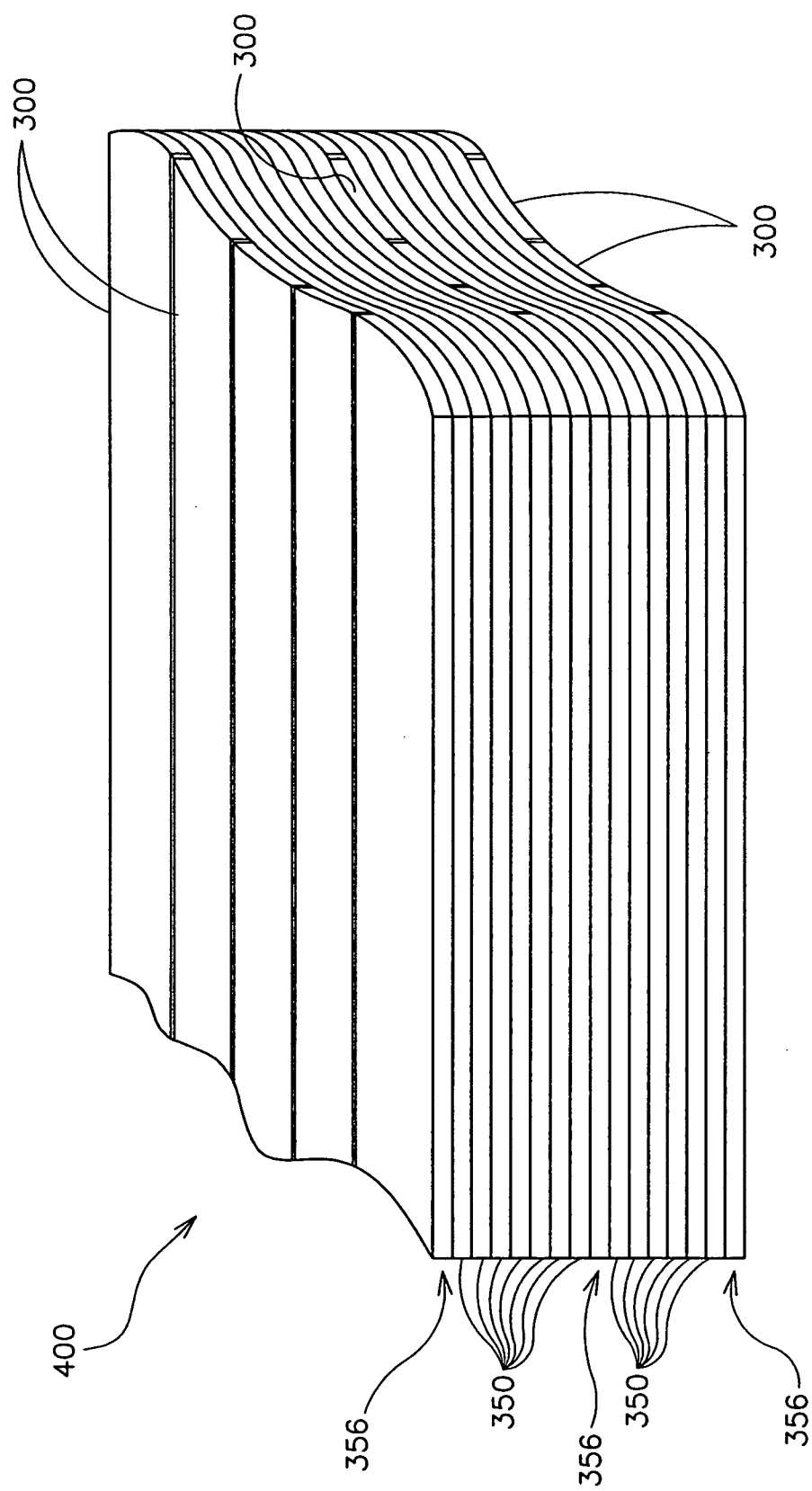
FIG. 9 is a perspective of a portion of a laminated fiber metal composite body of the present invention.

To form a laminated fiber metal composite body, generally designated by 400 in FIG. 9, the fiber metal composite preform 352 (FIG. 8) is infused with a resin mixture and laminated to bond the plurality of fiber plies 350 to the metal foil strip layer(s) 356. In one embodiment, the body 400 is cured after lamination to facilitate bonding the plurality of fiber plies 350 to the metal foil strip layer(s) 356. More specifically, a resin infusion process is used to infuse the resin mixture into the preform 352 such that the resin mixture flows through the plurality of fiber plies 350 and the gaps 358 (FIG. 8) in the metal foil strips layer(s). As the resin mixture flows through the fiber plies 350 and the metal foil strip layer(s) 356, the resin mixture intersperses between the plurality of fiber plies, and more specifically between the reinforcing fibers 354 of each fiber ply. A variety of resin infusion processes are suitable for infusing a resin mixture into the preform 352, such as, for example, resin transfer molding, vacuum assisted resin transfer molding, Seemann Composites Resin Infusion Molding Process (SCRIMP®), and controlled atmospheric pressure resin infusion. SCRIMP is a federally registered trademark of TPI Technology, Inc of Warren, R.I. A mold may be used when stacking the fiber plies 350 and the metal foil strip layer(s) 356, and during lamination of the preform 352, to control a shape of the laminated fiber metal composite body 400.

The above-described perforated metal foil sheet and metal foil strip layer are cost-effective and reliable for facilitating infusion of a resin mixture into a fiber metal composite without generally sacrificing the bearing strength of the composite. More specifically, during a resin infusion process, resin flows through the perforations in the metal foil sheet and/or the gaps in the metal foil strip layer, and intersperses between a plurality of fiber plies stacked together with the metal foil sheet and/or the metal foil strip layer to form the composite. As a result, a conventional resin infusion process may be used during lamination without the need to prepegg the fibers, wet-wind the fiber plies, and/or insert thin sheets of resin between the fiber plies prior to lamination.

Exemplary embodiments of laminated fiber metal composites are described above in detail. The composites are not limited to the specific embodiments described herein, but rather, components of each composite may be utilized independently and separately from other components described herein. Each laminated fiber metal composite component can also be used in combination with other laminated fiber metal composite components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of fabricating an aircraft part, the method comprising:
    laying up a plurality of fiber plies and flat metal foils, the fiber plies having reinforcing fibers oriented in a single direction, wherein said laying up includes positioning a plurality of said fiber plies between at least one of said foils in the form of a perforated metal sheet and at least one of said foils in the form of a non-perforated metal sheet;
    infusing resin into the resulting layup to flow past each perforated metal sheet and intersperse between the plurality of fiber plies and between the fibers of each ply; and
    curing the resin-infused layup to form the aircraft part as a fiber-metal laminate including both the fiber plies and the metal foils,
    wherein the fibers provide strength to the resulting part in the single direction, and
    wherein the foils provide bearing strength to the resulting part.

2. The method of claim 1, wherein perforations in each perforated metal sheet are formed with a pulsed laser.

3. The method of claim 1, wherein a resin transfer molding process is used to infuse the resin.

4. The method of claim 1, wherein a vacuum assisted resin transfer molding process is used to infuse the resin.

5. The method of claim 1, wherein the metal foils have a thickness between 10.005 inches to 0.015 inches.

6. The method of claim 1, wherein each perforated metal sheet has perforations having sizes between about 0.01 inches and about 0.04 inches.

7. The method of claim 6, wherein the perforations are spaced apart between about 0.25 inches and 2.0 inches.

* * * * *